March 16, 1965 R. D. MOAN 3,173,310
TRANSMISSION
Filed Aug. 20, 1962
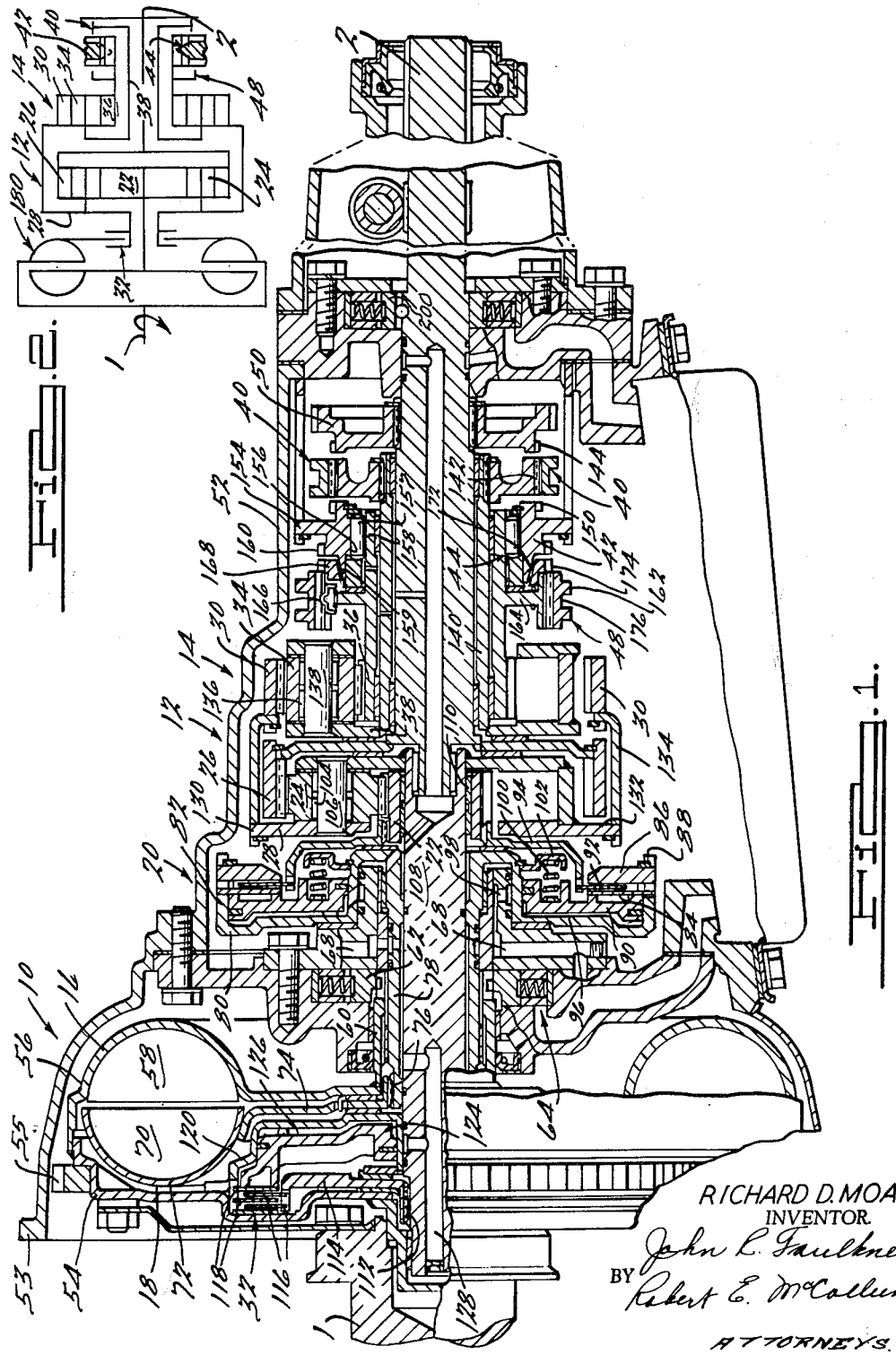
RICHARD D. MOAN
INVENTOR.
BY John L. Faulkner
Robert E. McCollum
ATTORNEYS.

United States Patent Office 3,173,310
Patented Mar. 16, 1965

3,173,310
TRANSMISSION
Richard D. Moan, Dearborn, Mich., assignor to Ford Motor Company, Dearborn, Mich., a corporation of Delaware
Filed Aug. 20, 1962, Ser. No. 218,010
12 Claims. (Cl. 74—688)

This invention relates to a transmission for a motor vehicle, and more particularly to one that is economical to manufacture and simplified in construction.

The invention combines the advantages of a hydrodynamic fluid coupling of either the fill and empty type or the constantly filled type with two simple planetary gear units. The coupling and gear units are controlled primarily by dog or jaw type clutches and brakes, and one, or at the most two, fluid pressure actuated clutches to provide three forward drive speed ratios and one reverse drive speed ratio. Thus, only a relatively simple fluid pressure control system is required, resulting in a transmission less susceptible to malfunction, and one affording considerable ease of assembly and disassembly.

Therefore, it is an object of this invention to provide a transmission mechanism providing three forward drive speed ratios and one reverse drive speed ratio effected by the combination of a fluid coupling and a number of planetary gear units conditioned for different driving operations in a simplified manner by the use of mechanically operated dog type clutches and brakes, and a minimum number of fluid pressure actuated devices.

It is a further object of the invention to provide a substantially automatic transmission that is small in size, light weight, and economical to manufacture, while still being simplified in construction, thereby affording ease of assembly and disassembly.

Further objects, features, and advantages will become apparent upon reference to the succeeding detailed description of the invention, and to the drawings illustrating the preferred embodiment thereof; wherein, FIGURE 1 is a cross sectional elevation view of a transmission embodying the invention, and FIGURE 2 is a diagrammatic illustration of the transmission of FIGURE 1 with a modified fluid coupling device.

The transmission illustrated in FIGURE 1, which is essentially to scale, provides three forward drive speed ratios, a reverse drive speed ratio, and neutral, as well as coast or hill braking. In general, as best seen in FIGURE 2, it consists of a power shaft 1 driving an output shaft 2 through a fluid coupling 10 and front and rear planetary gear units 12 and 14. Shaft 1, which may be connected to the engine of a motor vehicle, for example, is connected directly to the rotatable pump or impeller 16 of coupling 10 which, during operation of the transmission, is constantly filled. The pump faces and drives a turbine member 18 connected through a fluid pressure actuated friction clutch 20 to the sun gear 22 of the first or front planetary gear unit 12. Gear unit 12 is of the simple planetary type, and has a number of spaced pinions 24 meshing with sun gear 22 and a ring gear 26. The pinions are rotatably supported upon a carrier 28 directly connected to the ring gear 30 of the rear or second planetary gear unit 14. The carrier may also be connected directly to power shaft 1 by a fluid pressure actuated friction clutch 32.

Gear unit 14 is also of the simple planetary type, and has spaced pinions 34 meshing with the ring gear 30 and a sun gear 36. The pinions are rotatably supported upon a carrier 38. The output members of both gear units 12 and 14 are operatively connected to shaft 2, the front unit ring gear 26 being directly connected, while the rear unit carrier 38 is connected through a sliding double-acting jaw type mechanical connector 40. Connector 40 acts alternately as a clutch or brake, connecting the carrier 38 to output shaft 2 for a forward drive of this shaft, or connecting the carrier to a stationary portion 42 of the transmission housing 52 to condition the gear units 12 and 14 for a reverse drive, as will appear later.

Sun gear 36 may be held against rotation in a reverse or counter-clockwise direction, as viewed from the left of FIGURE 1, while being permitted to rotate in a clockwise direction, by a one-way overrunning brake 44 having its outer race fixed to the stationary portion 42. Thus, gear unit 14 is conditioned for a reduction drive by the locking-up of the overrunning brake upon reverse rotational tendency of sun gear 36. For coast braking, clockwise overrun of the sun gear 36 may be prevented by the engagement of a synchronizing brake 48 non-rotatably connected to the sun gear and adapted to slidably engage the stationary portion 42.

The planetary gear units 12 and 14 may be driven in three different ways; that is, by engaging clutch 20 alone, by engaging clutch 32 and disengaging clutch 20, or both gear units can be driven simultaneously by engaging clutches 20 and 32.

OPERATION

Neutral

With the engine running, fluid coupling 10 is normally filled. Disengagement of clutches 20 and 32, however, prevent a drive from power shaft 1 to the transmission gearing, thereby rendering the transmission inoperative to drive output shaft 2. If desired, a parking pawl (not shown) may be actuated to engage teeth 49 on drum 50 splined to the output shaft 2 to prevent rotation of the shaft.

Forward

For first or low speed forward drive, clutch 20 is engaged, and connector 40 is moved to connect carrier 38 to drum 50. Clutch 32 at this time is disengaged. Forward or clockwise rotation of power shaft 21, as indicated by arrow 51 in FIGURE 2, causes turbine 18 and sun gear 22 to be driven forwardly rotating carrier 28 and rear unit ring gear 30 in the same direction at a low speed. The front unit ring gear 26 at this time acts as a reaction member because of its connection to the stationary output shaft 2. The forward rotation of ring gear 30 attempts to rotate sun gear 36 reversely about the relatively stationary carrier 38, which motion is prevented by the overrunning brake 44. The rear unit 18 is thus conditioned for a reduction drive, and carrier 38 slowly drives output shaft 2 forwardly. A split torque power path is thus provided in first or low speed due to the output shaft 2 being driven simultaneously by the front unit ring gear 26 as well as by the rear unit carrier gear 38. The speed ratio, of course, will depend upon the relative sizes of the gears of the different units.

For second speed forward drive, the rear unit 14 provides the entire drive, the front unit 12 merely idling. To accomplish this, clutch 20 is disengaged and clutch 32 engaged, while the other connections remain the same as for first speed operation. Accordingly, forward rotation of power shaft 1 dirves the front unit carrier 28 and rear unit ring gear 30 forwardly rotating carrier 38 and output shaft 2 in the same direction at a speed ratio determined solely by the reduction through unit 14.

If the motor vehicle begins to coast during first or second speed forward drives, engine braking may be provided by additionally engaging brake 48 to lock sun gear 36 to member 42, thus positively maintaining the rear unit 14 conditioned for a reduction drive. Any drive of shaft 2 therefore will be transmitted through the rear gear unit to the power shaft 1 by carrier 28 and clutch 36.

Third speed of direct forward drive is accomplished by simultaneously engaging clutches 20 and 32. Clockwise rotation of power shaft 1 simultaneously drives front unit sun gear 22 and carrier 28 substantially at the same speed thereby locking up gear unit 12 to provide a drive of ring gear 26 and therefore output shaft 2 at engine speed. The slip through coupling 10 is substantially negligible so that sun gear 22 is, for all intents and purposes, rotating at the speed of carrier 28. The rear unit 14 is likewise locked up by the carrier 38 and ring gear 30 being driven at the same speed. The sun gear 36 at this time overruns freely by the unlocking of one-way brake 44.

*Reverse*

Reverse drive is established by sliding connector 40 to the left to disengage it from drum 50 and connect carrier 38 to stationary portion 42. Upon engagement of clutch 20 and release of clutch 32, clockwise rotation of shaft 1 rotates sun gear 22 forwardly. Output shaft 2 and ring gear 26 being stationary, front unit carrier 28 attempts to rotate forwardly to rotate ring gear 30 in the same direction. However, carrier 38 is held against rotation, and sun gear 36 is prevented from reverse rotation by one-way brake 44. Therefore, both the rear gear unit 14 as well as front unit carrier 28 are held stationary, causing a reverse or counterclockwise rotation of ring gear 26 to drive output shaft 2 in a direction opposite to the direction of rotation of power shaft 1.

Referring now to the specific details of construction of the transmission, FIGURE 1 shows the transmission enclosed by a bell-shaped housing 52 open at opposite ends. The forward end 53 receives the power shaft 1, which has a conventional fly-wheel 54 bolted to it as shown. A starter gear 55 is fixed to the fly-wheel. The fly-wheel has a semi-toroidal impeller outer shroud member 56 welded to it, the shroud supporting a number of circumferentially spaced dish-shaped impeller blades 58 secured thereto. Shroud 56 extends radially inwardly for a splined connection to a sleeve shaft 60 to which the driving gear 62 of a fluid pressure pump 64 is secured. The pump may be a known gear type providing an output fluid pressure in a line 68.

Facing the impeller blades 58 to be driven thereby are a similar number of circumferentially spaced-shaped turbine blades 70 secured within a semi-toroidal outer shroud 72. The impeller and turbine blades and outer shrouds form a toroidal working fluid circuit for transmitting driving torque from the impeller to the turbine. The turbine outer shroud has a radial inner extension 74 splined at 76 to one end of a sleeve shaft 78 constituting the driving member of the fluid pressure actuated clutch 20.

For this purpose, the rearmost end of sleeve shaft 78 is shaped to form a clutch housing 80 having an outer drum 82. Drum 82 is internally splined for non-rotatably mounting therein an annular friction clutch disc 84 and a backing member 86 axially located between a snap ring 88 and a piston actuating member 90. The driven portion of the clutch consists of an annular friction disc 92 internally splined to a radially extending member 94 splined to the sun gear 22 of the gear unit 12. Clutch 20 is engaged to connect sun gear 22 and turbine 18 by admission of fluid under pressure to the chamber 96 between piston 90 and the clutch housing 80. The fluid is supplied from a line 98 connected to the fluid pump outlet line 68. Exhaust of fluid from chamber 96 permits disengagement of the clutch by springs 100 acting between the piston 90 and an annular cup-shaped base plate 102 secured to the hub of the clutch housing 80.

Sun gear 22 meshes with a number (generally three) of pinions 24 rotatably mounted by bearings 104 on pinion shafts 106 secured in carrier 28. The carrier is splined at its inner edge to a shaft 108 rotatably supported within sleeve shaft 78 by sleeve bearings 110. The forward end of shaft 108 is adapted at times to be clutched to the power shaft 1 by clutch 32, and is splined at 112 to an annular friction disc supporting flange 114. Two annular friction discs 116 are non-rotatably secured to flange 114 and alternatingly located between three friction discs 118 splined to an annular clutch housing 120. Housing 120 is fixed to the fly-wheel 54 and sealingly encloses and slidably receives a piston 124 adapted to abut the clutch discs 120. The clutch is normally disengaged by coupling charge pressure acting against the clutch stack side of the piston. It is engaged by admitting fluid under a higher pressure to the space 126 between piston 124 and housing 120 from a bore 128 in shaft 108 suitably connected to the pump outlet line 68.

Front gear unit carrier 28 is secured to rear unit ring gear 30 by a splined connection at 130 between a radial extension 132 of the carrier and a drum 134 splined to ring gear 30. The pinions 34 meshing with ring gear 30 are rotatably journalled by bearings 136 on three (only one shown) pinion shafts 138 secured to the carrier 38. The carrier is splined to one end of a sleeve shaft 140 rotatably mounted on output shaft 2 by sleeve bearings as shown. Non-rotatably but slidably splined on the opposite end of shaft 140 is the double-acting jaw type connector 40.

Connector 40 is shown in FIGURE 1 in its neutral position and has teeth 142 adapted to mesh either with teeth 144 formed on the drum member 50 fixed on the output shaft 2, or with teeth 150 provided on the stationary member 42. Member 42 is suitably fixed to the transmission housing through a splined connection at 154.

The member 42 serves a dual purpose. One portion 156 is formed as the stationary outer annular race of the one-way overrunning brake 44 separated by balls or sprags 157 from the inner race 158. Race 158 is face splined to an axial extension of the sun gear 36. Member 42 is also formed with a conical friction surface 159 and teeth 160 for cooperation with the synchronizing brake 48 rotatable with the sun gear 36.

The synchronizer may be of a known construction and includes a clutch sleeve 162 slidably but non-rotatably splined to the sun gear 36 by a flange 164. A thrust bar 166 connects the sleeve and flange to a blocker ring 168. The blocker ring has an internal conical friction surface 172 adapted to engage the stationary conical surface 159 upon axial movement of sleeve 162 and thrust bar 166 to the right from the positions shown in FIGURE 1. Once rotation of sun gear 36 is arrested by the engagement of the friction surfaces, teeth 174 on the blocker ring are engaged with teeth 160 on member 42 to hold the sun gear stationary.

As described, therefore, the one-way brake 44 prevents rotation of sun gear 36 only in a reverse or counterclockwise direction. Engagement of brake 48 will prevent rotation of the sun gear in any direction. To effect this engagement, the sleeve 162 is formed with a groove 176 engaged at all times by an operator controlled shift lever (not shown) for axially moving the sleeve and blocker ring.

FIGURE 2 shows a slight modification of the FIGURE 1 construction, wherein a fluid coupling 180 of the fill and empty type is substituted for both the constantly filled coupling 10 and clutch 20 of FIGURE 1. In all other respects, the two transmissions are identical. The FIGURE 2 construction provides the advantage of requiring the use of only one fluid pressure actuated clutch 32, instead of two as shown in FIGURE 1. In all forward and reverse drive speed ratios, therefore, the coupling 180 would be filled at the time clutch 20 of FIGURE 1 would normally be engaged, or emptied when clutch 20 is to be released. The details of the fluid coupling 180 are known and are therefore believed to be unnecessary for an understanding of the invention. A coupling of the type shown in the U.S. Patent to Cheek, 2,916,881, Controlled Fluid Coupling, would suffice.

The fluid pressure control system and mechanical connections for controlling the filling and emptying of the coupling 180, maintaining coupling 10 filled, and effecting the engagement of clutches 20 and 32, as well as the engagement or disengagement of brake 48 and connector 40, are not shown since they form no part of this invention and are believed to be unnecessary for an understanding of the invention. Suffice it to say, however, that the vehicle operator would initially manually position the connector 40 to condition the transmission either for a forward or reverse drive operation. This same actuation could, of course, activate the control system to automatically engage the different clutches, fill coupling 10, or fill or empty coupling 180 in the desired manner to provide the establishment of the speed ratio drive desired, with subsequent automatic progressive changes between first, second, and third speed drives in a known manner. To this end, a pump 200 splined upon output shaft 2 is used to produce a control pressure varying as a function of vehicle speed.

From the foregoing therefore, it will be seen that the invention provides a transmission having a plurality of forward speed drives and a reverse drive as well as hill braking through the use of a fluid coupling combined with two sets of planetary gear sets controlled by mechanical clutches and brakes and one or more fluid pressure actuated clutches. It will also be seen that the invention provides a transmission that is economical to manufacture and simplified in construction.

While the invention has been illustrated in its preferred embodiments, it will be clear to those skilled in the arts to which the invention pertains that many changes and modifications may be made thereto without departing from the scope of the invention.

I claim:

1. A transmission having a plurality of input shafts and an output shaft, and first and second gear sets each having a plurality of members for connecting said shafts to provide forward and reverse drives through said transmission, means connecting one of said input shafts to a drive member of said first gear set, releasable means connecting another of said input shafts to a second drive member of said first gear set and to a member of said second gear set, means connecting a third member of said first gear set to said output shaft, brake means holding a second member of said second gear set stationary to provide a reduction drive through said gear sets, and other means alternately connecting a third member of said second gear set to said output shaft or holding said third member stationary, the selective operation and combination of said releasable means, brake means, and other means providing said forward and reverse drives through said transmission.

2. A transmission gear train having first and second input shafts and an output shaft, and first and second gear units each having drive, driven and other rotatable members for connecting said shafts to provide a plurality of forward speed drives and reverse through said gear train, first clutch means connecting said first input shaft to drive members of both of said gear units, means connecting the driven members of the gear units to said output shaft, means connecting said second input shaft to another drive member of one of said gear units, a one-way device for holding a rotatable member of one gear unit stationary in one direction of rotation to establish said member as a reaction for reduction drives through the gear train from said input to said output shafts, the means connecting one of the driven members to said output shaft including a double-acting positive engaging means alternately grounded or engageable with said output shaft, the selective combination and actuation of said first clutch means and one-way device and engaging means providing said forward and reverse drives.

3. A transmission including in combination, input and output shafts, and means operably connecting said shafts for providing a plurality of forward and reverse drives through said transmission, said means including a fluid coupling capable of being filled or emptied of fluid and a plurality of gear sets, said gear sets each having interconnected sun, pinion, and ring gears and a planet carrier member, said coupling having a pump connected to said input shaft and a turbine connected to the sun gear of a first one of the gear sets, fluid pressure actuated clutch means connecting said pump to the carrier member of said one gear set and to the ring gear of another of said gear sets, means connecting the ring gear of said one gear set to said output shaft, further means including overrunning brake means operatively connected to the sun gear of said another of said gear sets and at times operable to condition said gear sets for a reduction forward drive, and double acting engaging means connected to the carrier member of said another gear set and movable alternately into engagement with said output shaft or said brake means, the filling of the fluid coupling together with the operation of said overrunning means and the release of said fluid pressure actuated clutch means and the engagement of said engaging means with said output shaft providing one forward drive through said transmission from said input to output shafts, the subsequent engagement of said fluid pressure actuated clutch means and the overrun of said one-way means providing a direct drive through said gear sets, the subsequent release of said clutch means and engagement of said engaging means with said brake means establishing a reverse drive through said transmission.

4. A transmission including in combination, input and output shafts, and means operably connecting said shafts for providing a plurality of forward drives and a reverse drive through said transmission, said means including a fluid coupling and a plurality of gear sets, said gear sets each having interconnected sun, pinion and ring gears and a planet carrier member, said coupling having a pump connected to said input shaft, fluid pressure operated clutch means connecting said turbine to the sun gear of a first one of the gear sets, fluid pressure actuated clutch means connecting said pump to the carrier member of said one gear set and to the ring gear of another of said gear sets, means connecting the ring gear of said one gear set to said output shaft, further means including one-way brake means operatively connected to the sun gear of said another of said gear sets and at times operable to condition said gear sets for reduction forward drives, and double acting engaging means connected to the carrier member of said another gear set and movable alternately into engagement with said output shaft or said brake means the alternate selective operation of said clutch means together with the engagement of said engaging means with said output shaft and the operation of said brake means providing single or split torque power paths forward drives through said transmission from said input to output shafts, the subsequent engagement of the other of said fluid pressure clutch means and the release of said brake means providing a direct drive through said gear sets, the subsequent release of said other clutch means and the engagement of said engaging means with said brake means establishing a reverse drive through said transmission.

5. A transmission including in combination, input and output shafts, and means connecting said shafts for providing a plurality of forward and reverse drives through said transmission, said means including a fluid coupling capable of being filled and emptied of fluid and a plurality of planetary gear sets, said gear sets each having intermeshed sun, pinion, and ring gears and a planet carrier member, said coupling having an impeller connected to said input shaft and a turbine connected to the sun gear of a first one of the gear sets, fluid pressure actuated clutch means connecting said impeller to the carrier member of said one gear set and to the ring gear of another of said gear sets, means connecting the ring gear of said one gear set to said output shaft, further means including one-way brake means operatively connected to the sun gear of said another of said gear sets when engaged operable to condition said gear sets for reduction drives, said further means also including two-way brake means selectively engageable with a ground connection and being connected to said another gear set sun gear for at times bypassing said one-way means to hold the sun gear stationary in any direction, and double-acting connecting means alternately connecting the carrier member of said another gear set to said output shaft for forward drive or to said ground connection for holding said carrier member stationary, the selective combination and operation of the fluid coupling, fluid pressure actuated clutch means, overrunning means, and brake means providing said plurality of forward drives and reverse through said transmission from said input to output shafts.

6. A transmission gear train having a plurality of input shafts and an output shaft, and a plurality of interconnected gear units operably connecting said shafts for providing forward and reverse drives through said gear train, said gear units each having a plurality of rotatable members including input and output members, means connecting one of said input shafts to a member of all of said gear units and another of said input shafts to another member of one of said gear units, means connecting an output member of each of said units to said output shaft, and brake means holding a member of one of said units stationary for establishing a forward reduction drive to provide a dual power path reduction drive through said units and said output members from said input to said output shafts, the connection between one of said input shafts and said gear train including disengageable means to interrupt or establish the drive therebetween, said means connecting said gear unit output members to said output shaft including a combination clutch and brake means connected to the output member of one of said gear units between said output shaft and said brake means and movable alternately to clutch said latter named output member to said output shaft for forward drive of said shaft or to said brake means to brake said latter named output member to provide a reverse drive of said output shaft upon disengagement of said disengageable means.

7. A transmission gear train having an input shaft and an output shaft, and a plurality of interconnected gear units operably connecting said shafts for providing forward and reverse drives through said gear train, said gear units each having a plurality of rotatable members including input and output members, fluid coupling means having a pump and turbine, means connecting said pump to said input shaft and to a member of all of said gear units, means connecting said turbine to another member of one of said gear units, means connecting an output member of each of said units to said output shaft, and brake means holding a member of one of said units stationary for providing a dual power path reduction drive through said units and said output members from said input to said output shafts, the connection between said pump and said gear units including disengageable means to disconnect said pump from the gear train, said means connecting said gear unit output members to said output shaft including a double acting means secured to the output member of one of said gear units between said output shaft and said brake means and movable alternately to clutch said latter named output member to said output shaft for the forward drives of said shaft or to said brake means to brake said latter named output member to provide a reverse drive of said output shaft upon disengagement of said disengageable means.

8. A transmission gear train having a plurality of input shafts and an output shaft, and a plurality of interconnected gear units operably connecting said shafts for providing a plurality of forward speed drives and a reverse drive through said gear train, said gear units each having a plurality of rotatable members including input and output members, means connecting one of said input shafts to a member of all of said gear units and another of said input shafts to another member of one of said gear units, means connecting the output members of each of said units to said output shafts, and brake means for conditioning said units to provide a dual power path reduction drive through said units and said output members from said input to said output shafts, the connections from one of said input shafts including disengageable means to disconnect said shaft from the gear train, said means connecting said gear unit members to said output shaft including a mechanical double acting connecting means axially slidably mounted on the output member of one of said gear units and movable between positions alternately clutching said latter named output member to said output shaft for forward drives of said shaft or engaging said latter named output member to said brake means to provide a reverse drive of said output shaft upon disengagement of said disengageable means.

9. A transmission including in combination, input and output shafts, and means operably connecting said shafts for providing forward and reverse drives through said transmission, said means including a fluid coupling capable of being filled or emptied of fluid and a plurality of gearsets, said gearsets each having a plurality of rotatable members including meshed sun, and planet, and ring gears and a planet carrier member, said coupling having a pump connected to said input shaft and a turbine connected to the sun gear of a first one of the gearsets, fluid pressure actuated clutch means connecting said pump to the carrier member of said one gearset and to the ring gear of another of said gearsets, means connecting the ring gear of said one gearset to said output shaft, further means including one-way over-running brake means operatively conected to the sun gear of said another of said gearsets and at times operable to hold said sun gear against rotation in one direction to condition said another of said gearsets for a reduction drive, and double-acting engaging means connected to said another gear set carrier member and alternately movable into engagement with said output shaft or said brake means, the filling of the fluid coupling together with the operation of said oneway brake means and the release of said fluid pressure actuated clutch means and the engagement of said carrier member with said output shaft providing one forward drive through said transmission from said input to output shafts, the subsequent movement of said engaging means to disengage said carrier member from said output shaft and engage it with said brake means to maintain it held stationary providing a reverse drive through said gearsets.

10. A transmission including in combination, input and output shafts, and means operably connecting said shafts for providing a plurality of forward and reverse drives through said transmission, said means including a fluid coupling and a plurality of gearsets, said gearsets each having a plurality of rotatable members including meshed sun, and planet and ring gears and a planet carrier member, said coupling having a pump connected to said input shaft, first fluid pressure actuated clutch means connecting said turbine to the sun gear of a first one of the gearsets, second fluid pressure actuated clutch means connecting said pump to the carrier member of said one gearset and to the ring gear of another of said gearsets, means connecting the ring gear of said one gearset to said output shaft, further means including brake means operatively connected to the sun gear of said another of said gearsets and operable at times to condition said another of said gearsets for a reduction drive, and double acting positive engaging means connected to said another gear set carrier member and alternately movable into engagement with said output shaft or said brake means, the alternate selective operation of one or the other of said fluid pressure actuated clutch means together with the engagement of said carrier member with said output shaft providing single or split torque forward drives through said transmission from said input to output shafts, the subsequent movement of said engaging means to engage said carrier member with said brake means providing a reverse drive through said gearsets upon release of said second fluid pressure actuated means.

11. A transmission having a plurality of input shafts and an output shaft, and first and second gear sets each having a plurality of rotatable members including sun and ring gears and a planet carrier member for operably connecting said shafts to provide forward and reverse drives through said transmission, means connecting one of said input shafts to said first gear set sun gear, releasable means connecting another of said input shafts to said first gear set carrier and to said second gear set ring gear, means connecting said first gear set ring gear to said output shaft, brake means holding said second gear set sun gear stationary to provide a reduction drive through said gear sets, and other means alternately connecting said second gear set carrier to said output shaft or holding said latter carrier stationary, the selective operation and combination of said releasable means, brake means, and other means providing said forward and reverse drives through said transmission.

12. A transmission gear train having first and second input shafts and an output shaft, and first and second gear units each having sun and ring gears and a planet carrier and other rotatable members for connecting said shafts to provide a plurality of forward speed drives and reverse through said gear train, first clutch means connecting said first input shaft to said first unit carrier and to the second unit ring gear, means connecting the first unit ring gear and second unit carrier to said output shaft, means connecting said second input shaft to the first unit sun gear, a one-way brake device for holding the second unit sun gear member against rotation in one direction to establish said member as a reaction member for reduction drives through the gear train from said input to said output shafts, the means connecting said second unit carrier to said output shaft including a double-acting positive engaging means alternately grounded or engageable with said output shaft, the selective combination and actuation of said first clutch means and one-way device and engaging means providing said forward and reverse drives.

References Cited by the Examiner
UNITED STATES PATENTS

| | | | |
|---|---|---|---|
| 2,272,934 | 2/42 | Cotal | 74—785 |
| 2,352,004 | 6/44 | Pollard | 74—677 |
| 2,371,564 | 3/45 | Wemp | 192—48 |
| 2,582,487 | 1/52 | Kelbel | 74—759 |
| 2,593,568 | 4/52 | Kelbel | 74—759 |
| 2,749,777 | 6/56 | Simpson | 74—688 X |
| 2,799,179 | 7/57 | Kelbel et al. | 74—763 X |
| 2,873,621 | 2/59 | Simpson | 74—688 |
| 2,874,590 | 2/59 | Kelbel | 74—688 |
| 2,892,365 | 6/59 | Winther | 74—759 |
| 2,995,897 | 8/61 | Parrish et al. | 74—677 X |
| 3,080,772 | 3/63 | Foerster | 74—759 X |

FOREIGN PATENTS 447,387  3/48  Canada.

DON A. WAITE, *Primary Examiner.*